I (12) United States Patent
Crippa et al.

(10) Patent No.: US 10,718,393 B2
(45) Date of Patent: Jul. 21, 2020

(54) SPRING OF A CALIPER OF A DISC BRAKE (71) Applicant: FRENI BREMBO S.p.A., Curno, Bergamo (IT)

(72) Inventors: Cristian Crippa, Bergamo (IT); Matteo Costa, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 0 days.

(21) Appl. No.: 15/314,304

(22) PCT Filed: May 26, 2015

(86) PCT No.: PCT/IB2015/053933
§ 371 (c)(1),
(2) Date: Nov. 28, 2016

(87) PCT Pub. No.: WO2015/181724
PCT Pub. Date: Dec. 3, 2015

(65) Prior Publication Data
US 2017/0102042 A1 Apr. 13, 2017

(30) Foreign Application Priority Data
May 27, 2014 (IT) .............................. BG2014A0016

(51) Int. Cl.
F16D 65/097 (2006.01)
F16D 55/228 (2006.01)

(52) U.S. Cl.
CPC ....... *F16D 65/0977* (2013.01); *F16D 55/228* (2013.01); *F16D 65/0972* (2013.01)

(58) Field of Classification Search
CPC .................... F16D 65/0972; F16D 65/0978
See application file for complete search history.

(56) References Cited

U.S. PATENT DOCUMENTS 3,638,765 A    2/1972  Flaherty et al.
3,977,499 A *  8/1976  Johannesen ......... F16D 55/2262
                                                    188/73.36

(Continued)

FOREIGN PATENT DOCUMENTS

DE    38 39 957 A1    5/1990
EP    1 709 341 B1    10/2010

(Continued)

OTHER PUBLICATIONS

International Search Report for corresponding International Patent Application No. PCT/IB2015/053933 dated Nov. 6, 2015, 3 pgs.

*Primary Examiner* — Bradley T King
*Assistant Examiner* — Mahbubur Rashid
(74) *Attorney, Agent, or Firm* — Merchant & Gould P.C.

(57) ABSTRACT

A spring of a caliper of a brake disc is capable of avoiding knocking of the pad against the rests of the caliper body and suitable to be arranged astride a disc of a brake disc. The spring includes a sheared and bent laminar body and is mounted on a caliper between an edge of a support plate of a pad, and at least one wall of a caliper body. The laminar body includes a tab portion bent as a spring, a first hooking portion having at least one C-shaped portion to be arranged astride the plate edge, and a second hooking portion resting on a radially outer portion of the plate edge.

23 Claims, 11 Drawing Sheets (56) References Cited

U.S. PATENT DOCUMENTS

| | | | | |
|---|---|---|---|---|
| 4,460,067 A | * | 7/1984 | Katagiri | F16D 66/02 |
| | | | | 188/1.11 W |
| 4,498,559 A | * | 2/1985 | Katagiri | F16D 66/02 |
| | | | | 116/208 |
| 4,940,119 A | | 7/1990 | Kondo et al. | |
| 7,040,464 B1 | * | 5/2006 | Andrews | F16D 65/0977 |
| | | | | 188/73.38 |
| 7,152,717 B2 | * | 12/2006 | Lelievre | F16D 65/0006 |
| | | | | 188/73.38 |
| 7,318,503 B2 | * | 1/2008 | Farooq | F16D 65/0974 |
| | | | | 188/205 A |
| 2004/0222053 A1 | * | 11/2004 | Wemple | F16D 65/0977 |
| | | | | 188/73.38 |
| 2005/0274579 A1 | * | 12/2005 | Nogiwa | F16D 65/0972 |
| | | | | 188/73.38 |
| 2007/0205061 A1 | * | 9/2007 | Yagi | F16D 55/22 |
| | | | | 188/73.38 |
| 2014/0291082 A1 | * | 10/2014 | Mallmann | F16D 65/0971 |
| | | | | 188/250 E |
| 2014/0345984 A1 | * | 11/2014 | Kamiya | F16D 65/0006 |
| | | | | 188/73.38 |

FOREIGN PATENT DOCUMENTS

| | | |
|---|---|---|
| GB | 2 109 065 A | 5/1983 |
| JP | 2011-163520 A | 8/2011 |

* cited by examiner

SPRING OF A CALIPER OF A DISC BRAKE

This application is a National Stage Application of PCT/IB2015/053933, filed 26 May 2015, which claims benefit of Serial No. BG2014A000016, filed 27 May 2014 in Italy and which applications are incorporated herein by reference. To the extent appropriate, a claim of priority is made to each of the above disclosed applications.

FIELD OF THE INVENTION

The present invention refers to a spring of a caliper of a disc brake.

In particular, the present invention refers to a spring capable of avoiding the knocking of the pad against the rests of the caliper body suitable to be arranged astride a disc of a brake disc. Said spring comprises a sheared and bent laminar body which extends along a line of development in a substantially tangential direction, i.e. the circumferential direction, when the spring is mounted on a caliper and in operating conditions. This spring is suitable to be interposed between an edge of a support plate of a pad and at least one wall of a caliper body to influence the pad at least in a tangential direction when the spring is mounted on a caliper and in operating conditions. This spring is shaped so as to be arranged astride the edge of the support plate in proximity of a radially outer edge thereof and arrange the laminar body astride a radially outer edge of the support plate.

STATE OF THE ART

As known, in brake disc calipers opposite pads are pressed, due to the action of at least one piston, against opposite braking surfaces of a braking band of the associable brake disc.

This piston is usually accommodated in a cylinder, obtained in the body of the caliper and it is energized by a brake fluid pressurized by a brake pump, usually of the pedal activated type.

Braking calipers where the piston, or pistons, are energized electronically, for example by rotating a worm screw accommodated in the body of the piston and rotated by an electric motor, or more commonly by a reduction gear, are also known.

The prior art pads are generally subjected to unpleasant vibrations, swaying and noise that particularly occur during the step of approaching of the pad to the disc and light braking.

Examples of known braking pads are for example described in U.S. Pat. No. 4,940,119.

Document EP01709341, of the same applicant, shows spring for a caliper of a brake disc comprising a cut laminar which extends along a curvilinear line of development. This known spring is suitable to be interposed between a side of a support plate of a pad and walls of a body to maintain the pad compressed between two springs and against walls of the body of the caliper, in which the spring has a base portion of which comprises a loop having a position and shape such to wind a corresponding lateral wing of the pad.

Though allowing overcoming the problem related to the knocking which occurs when the plate impacts against the body of the caliper, the known solution requires a specific and particular geometry both in the shape of the plate and the body of the caliper, and thus it can be utilized only after completely re-designing the brake.

Thus, there arises the need of providing a spring of a caliper of a disc brake capable of allowing application in disc brake disc calipers already available in the market, as well as in new-concept calipers but designed in a way not to allow modifications on the overall dimension of the pads.

Thus, there strongly arises the need to provide a spring of a caliper of a disc brake especially capable of allowing avoiding the knocking of the pad against the rests provided on the caliper body in particular when changing the motion of the vehicle, for example shifting from a forward to reverse gear of the vehicle.

Solution

Thus, an object of the present invention is to provide a spring, as well as an assembly spring pad and a caliper, capable of allowing attaining the aforementioned needs, as well as overcoming the drawbacks of the aforementioned state of the art.

Some advantageous embodiments are subject of the dependent claims.

FIGURES

Further characteristics and advantages of the assembly according to the invention shall be more apparent from the description of its preferred embodiments outlined below, provided by way of non-limiting example, with reference to the attached figures, wherein.

DESCRIPTION OF SOME PREFERRED EMBODIMENTS

With reference to the aforementioned figures and according to a general embodiment, a spring 1 of a caliper 2 of a brake disc, caliper which is suitable to be arranged astride a disc of a brake disc 15, comprises a sheared and bent laminar body 3 which extends along a line of development arranged substantially in tangential direction T-T, when the spring is mounted on a caliper and in operating conditions.

Figure 1:
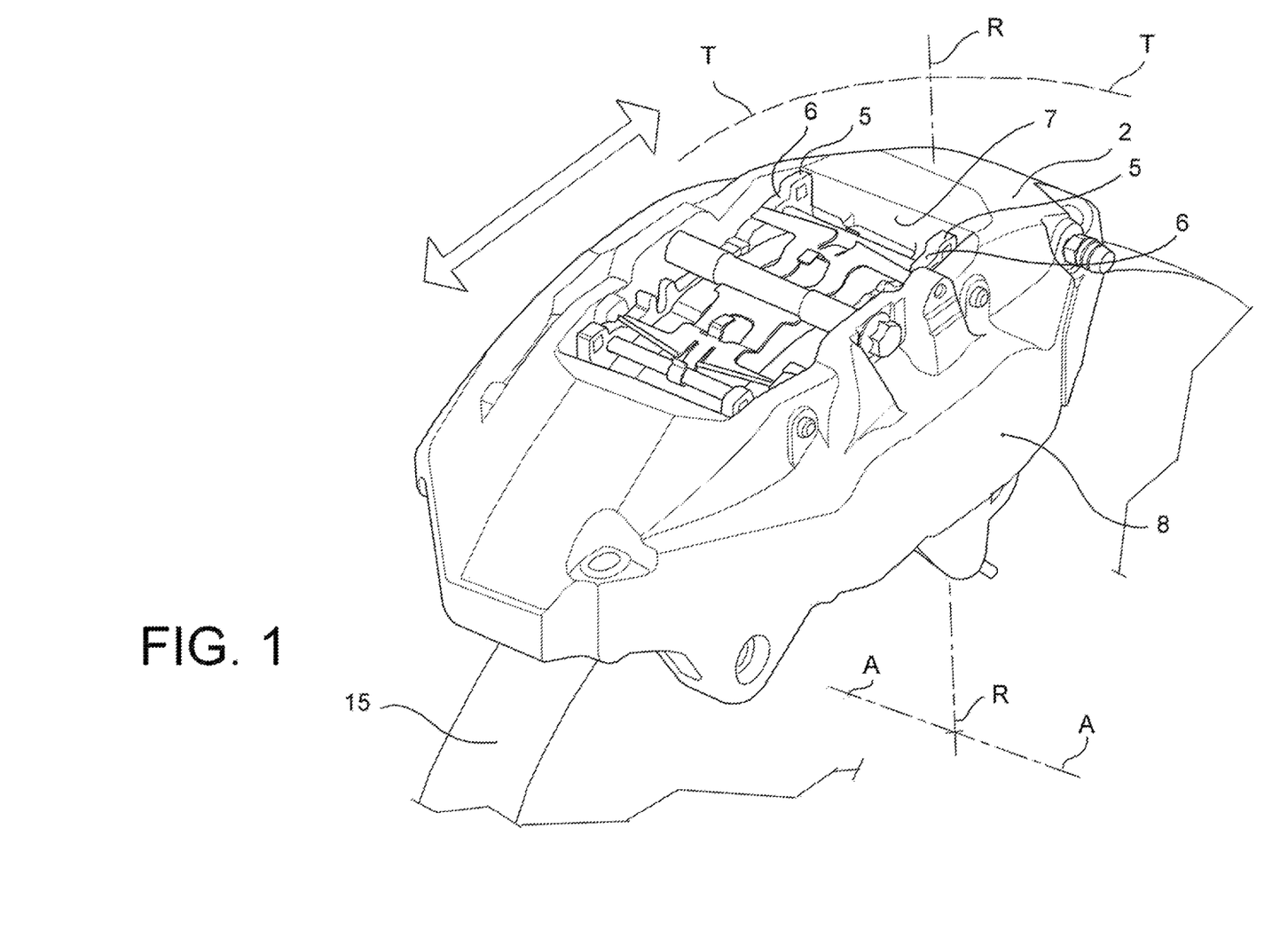
FIG. 1 represents—in a partly sectioned axonometric view—a brake disc caliper arranged astride a brake disc wherein the pad is subjected to impacts or knocks against the surfaces of the body of the caliper when braking in case of change of direction of travel.
Figure 2:
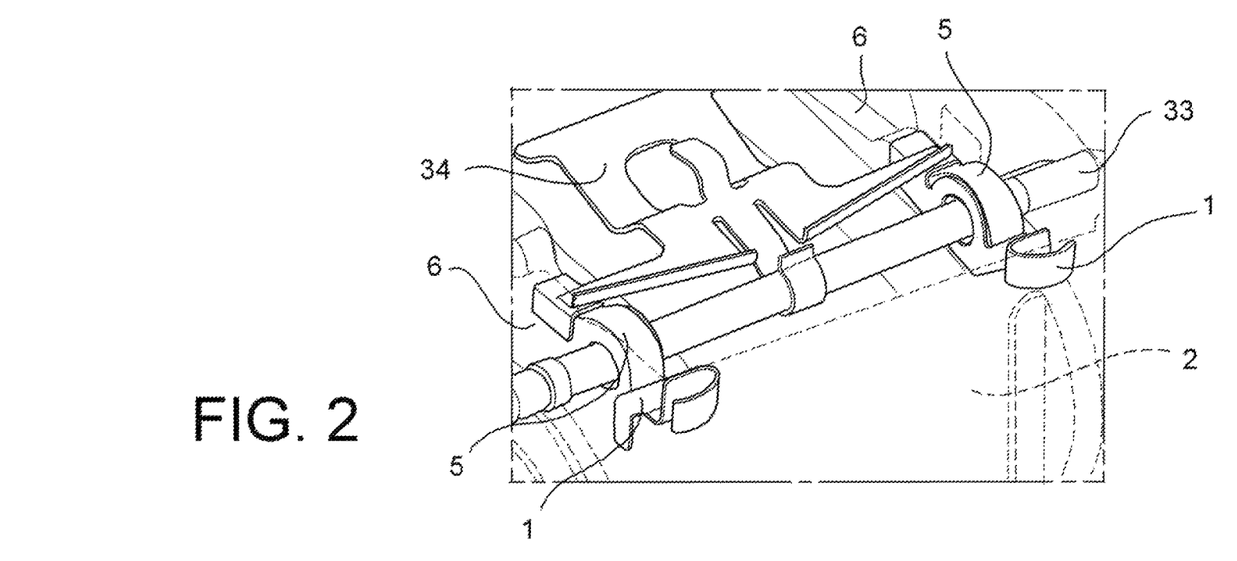
FIG. 2 represents—in axonometric view—a detail of the caliper of FIG. 1 in which springs according to the invention are applied to the ends of both pads.
Figure 3:
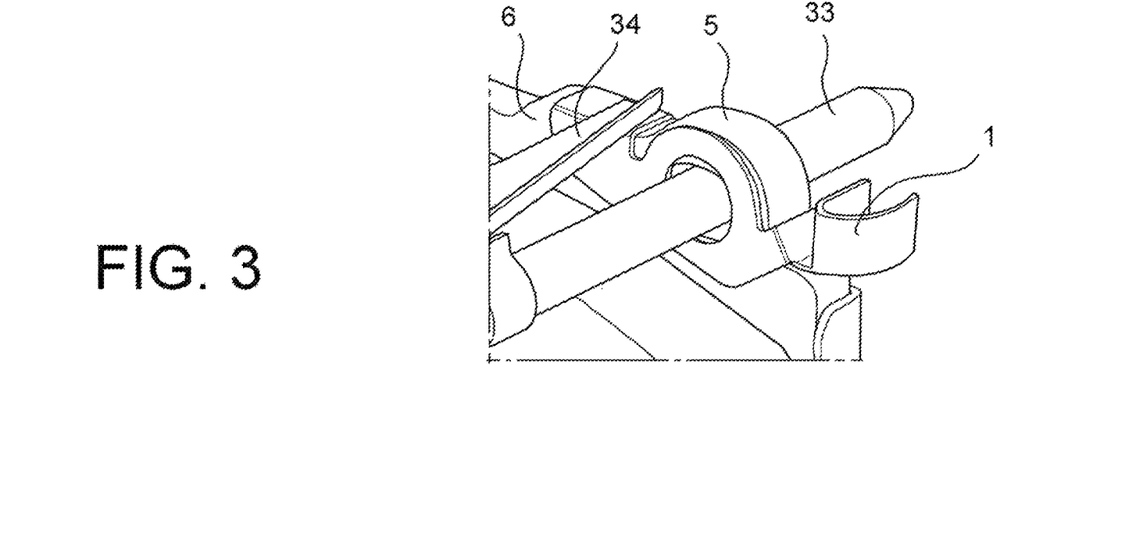
FIG. 3 represents—in axonometric view—a detail of the solution of FIG. 2 according to a different point of view and focusing only one spring.
Figure 4:
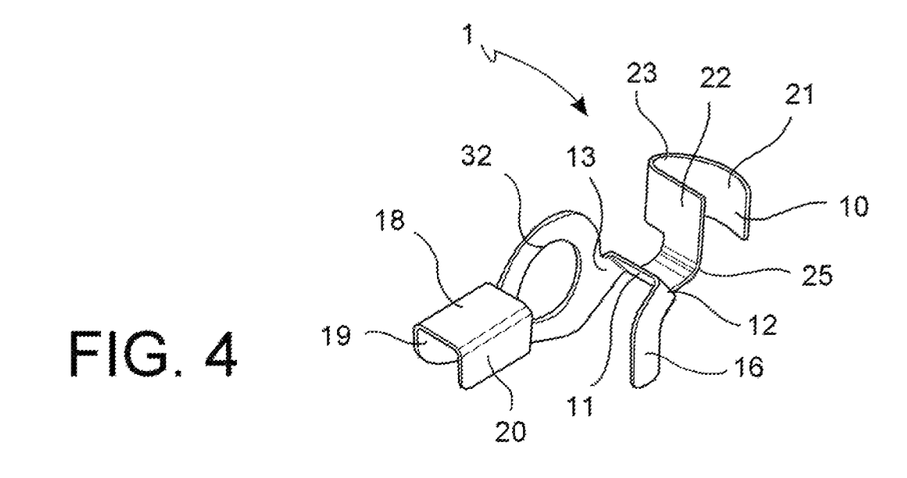
FIG. 4 represents—in axonometric view—a spring according to one embodiment of the invention.
Figure 5:
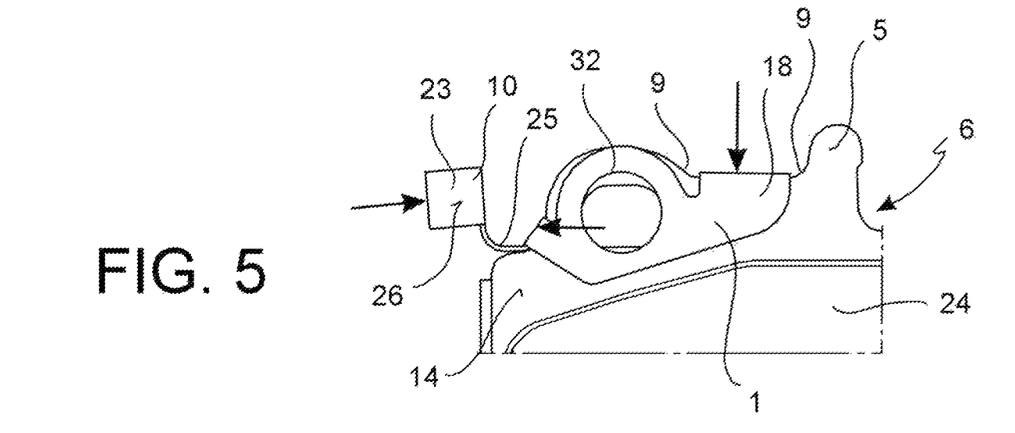
FIG. 5 represents—in axonometric view—a spring according to a first embodiment arranged astride an upper edge of a pad, in which the actions exerted by the caliper on the spring are outlined.
Figure 6:
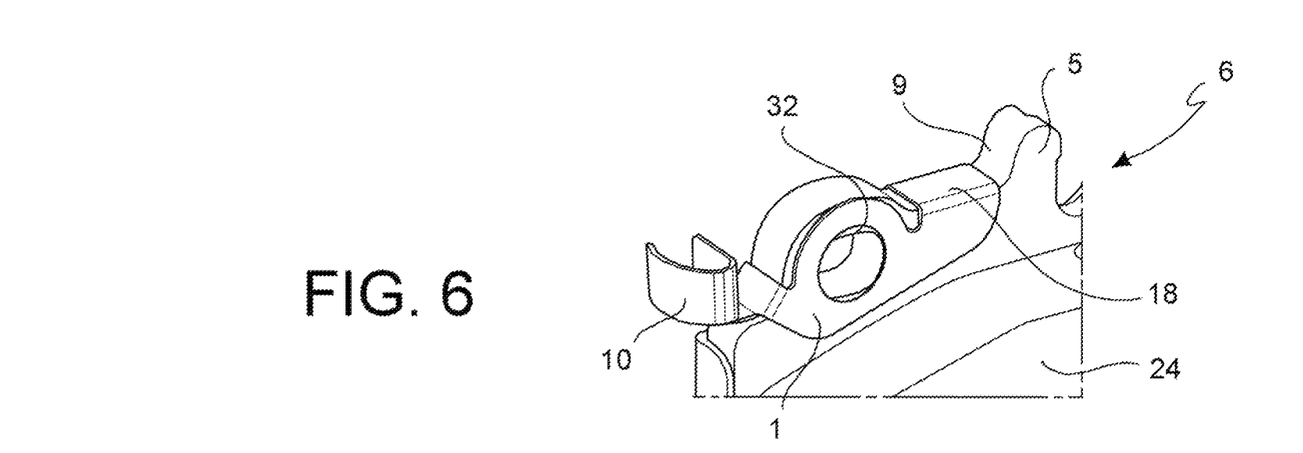
FIG. 6 represents—in axonometric view—a detail of the solution of FIG. 5.
Figure 7:
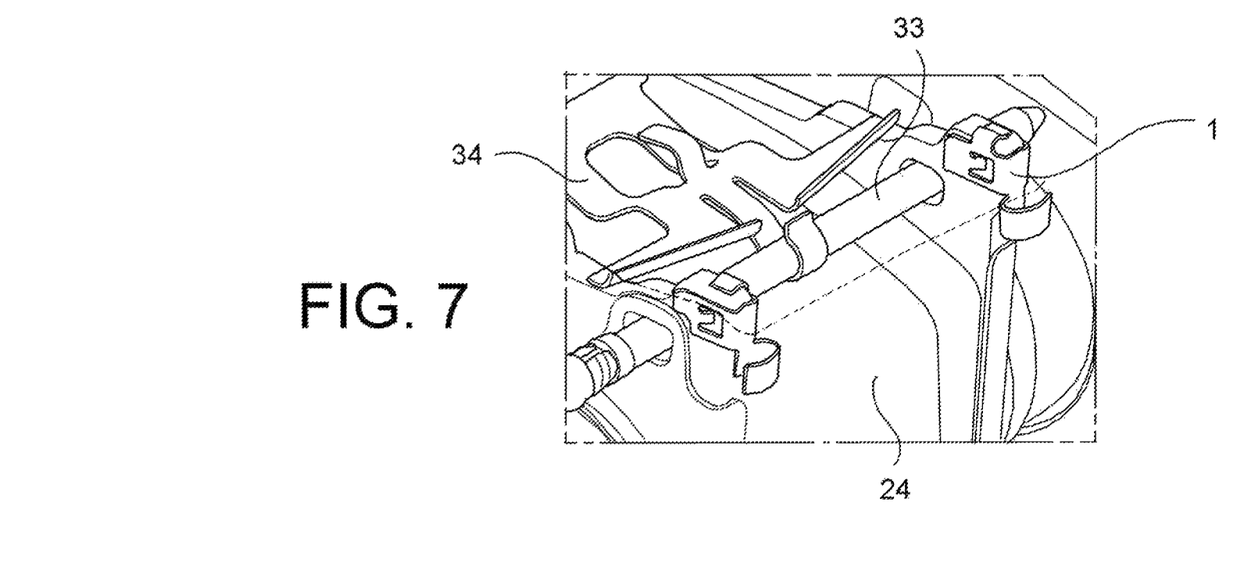
FIG. 7 represents—in axonometric view—a detail of a caliper in which two springs according to a further embodiment are provided, applied to the edges of two opposite pads.
Figure 8:
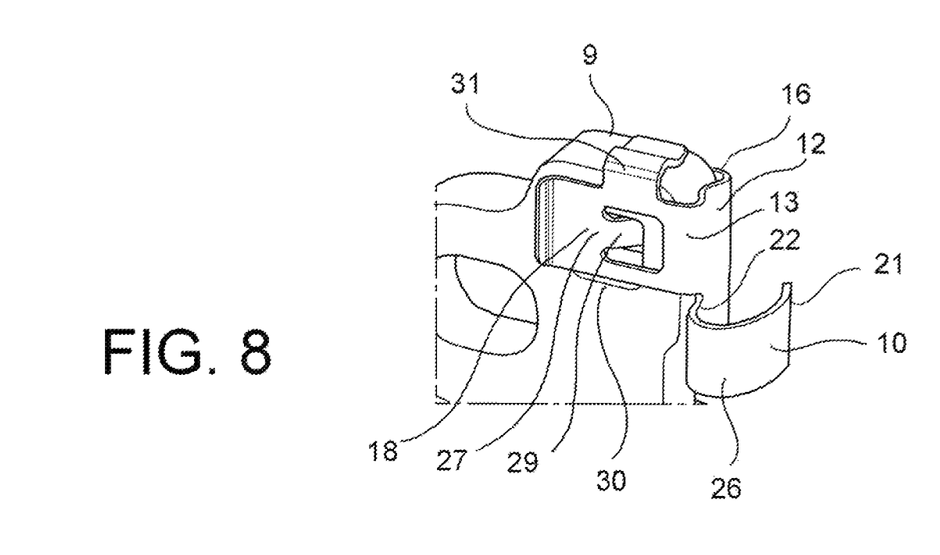
FIG. 8 represents—in axonometric view—a detail of a pad to which a spring is applied according to the invention.
Figure 9:
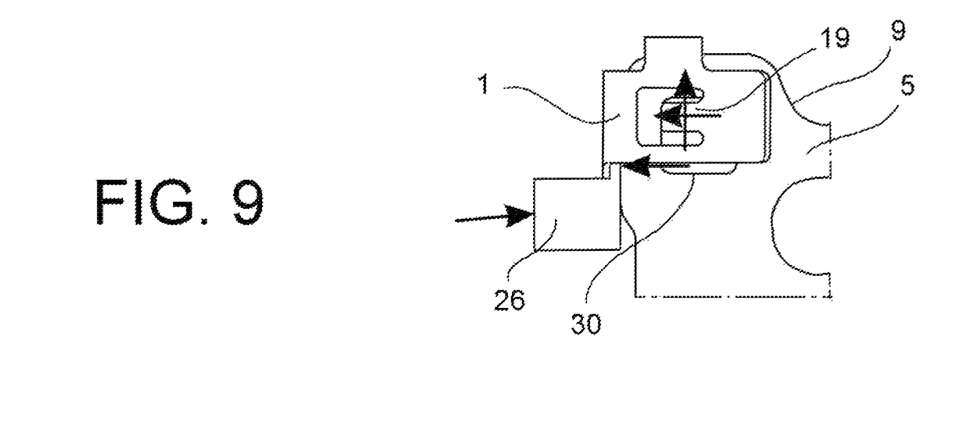
FIG. 9 represents—in axonometric view—the spring of FIG. 8 in which the actions exerted on the spring and by the spring to the pad are outlined.
Figure 10:
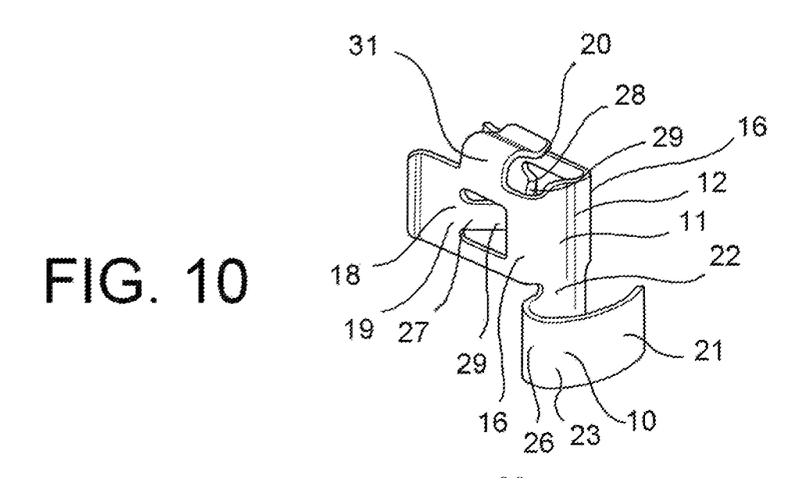
FIG. 10 represents—in axonometric view—a spring according to a further embodiment.
Figure 11:
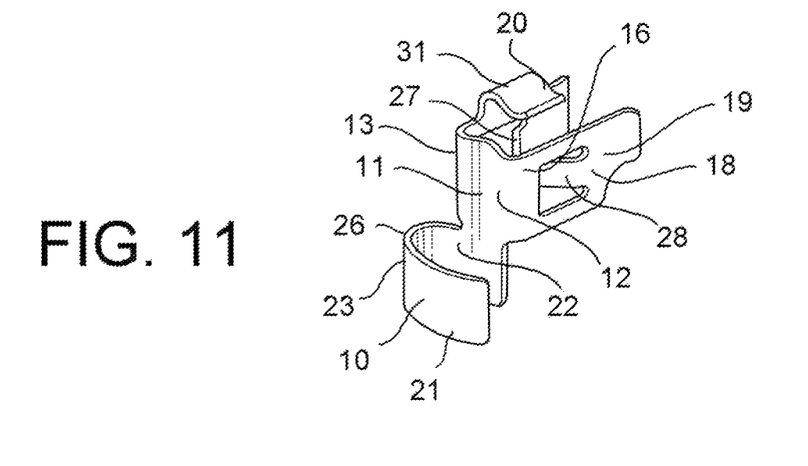
FIG. 11 represents—in a different but still axonometric view—the spring of FIG. 10.
Figure 12:
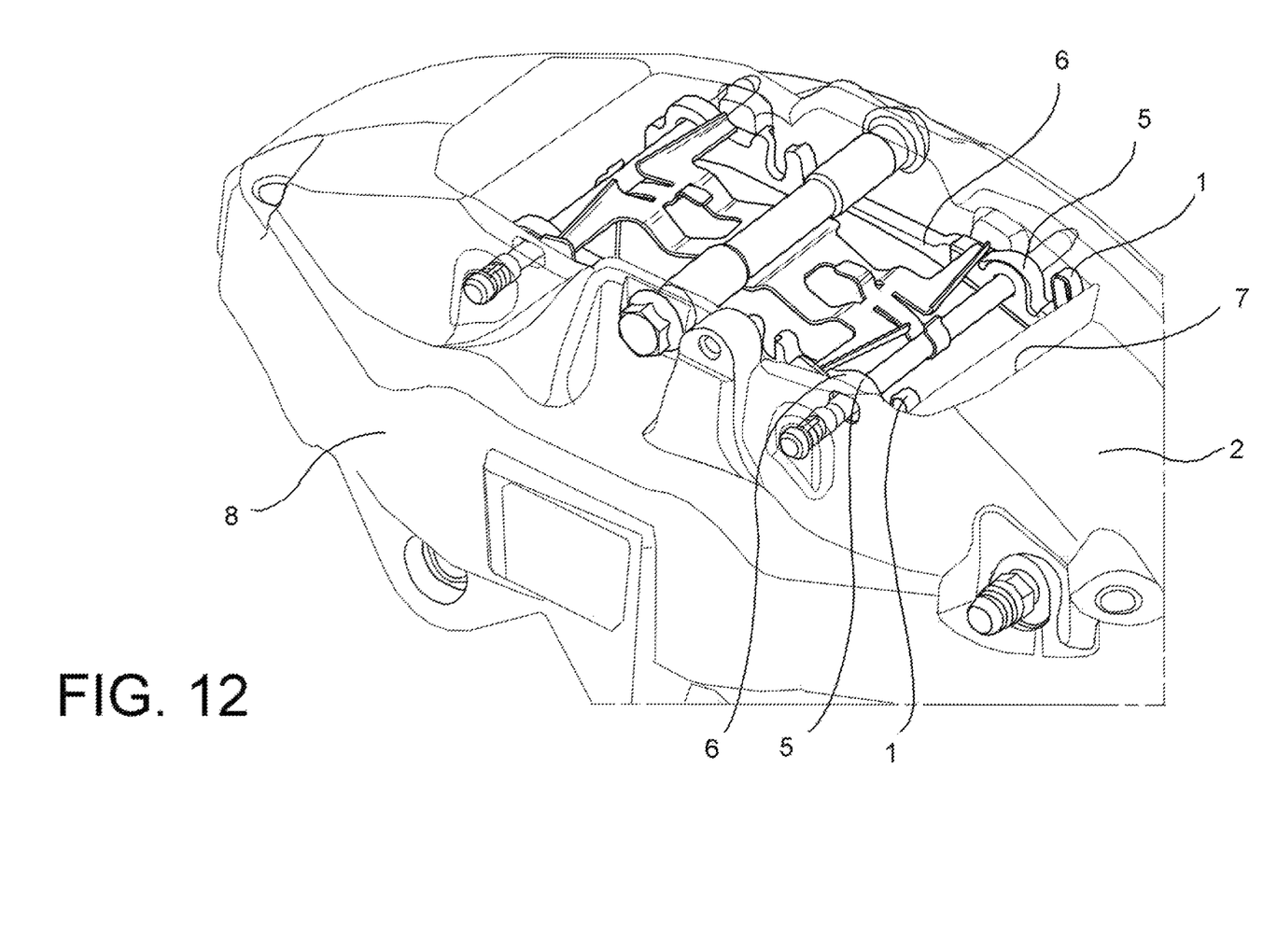
FIG. 12 represents a detail—in axonometric view—of a caliper on which two springs are applied to the ends of two opposite pads obtained according to a further embodiment.
Figure 13:
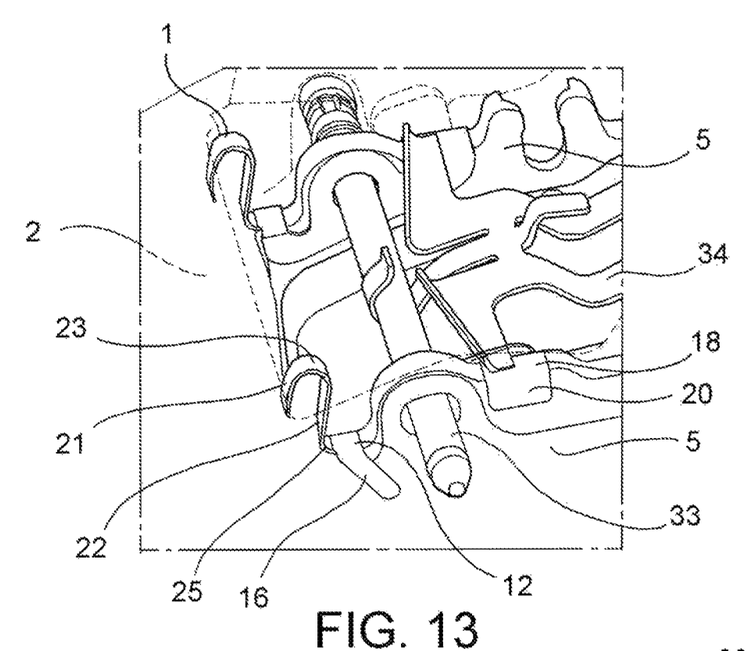
FIG. 13 represents a detail according to a different point of view of the caliper of FIG. 12.
Figure 14:
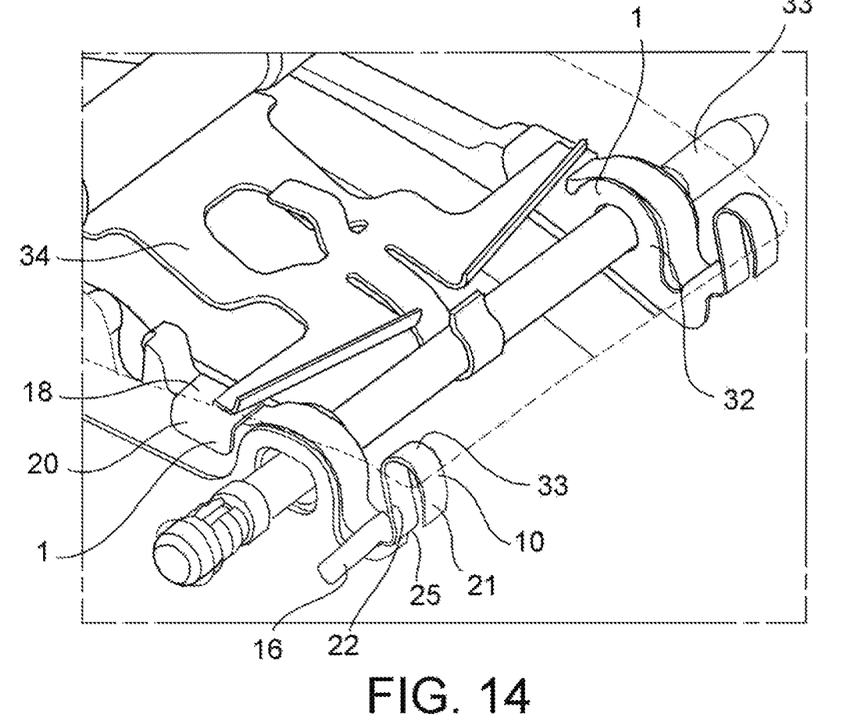
FIG. 14 represents a further detail according to a further point of view of the caliper of FIG. 12.
Figure 15:
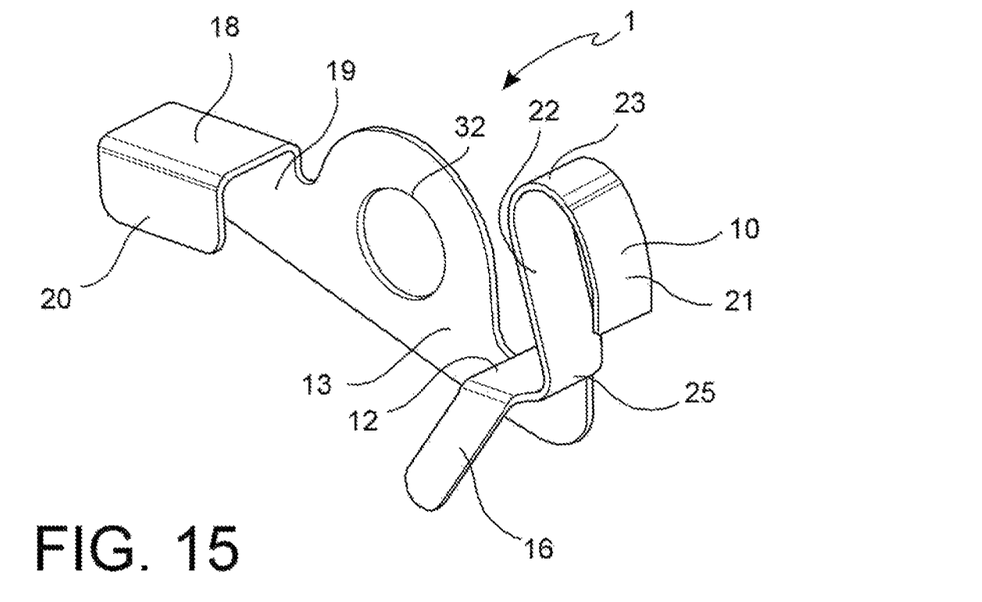
FIG. 15 represents—in axonometric view—a spring according to a further embodiment.
Figure 16:
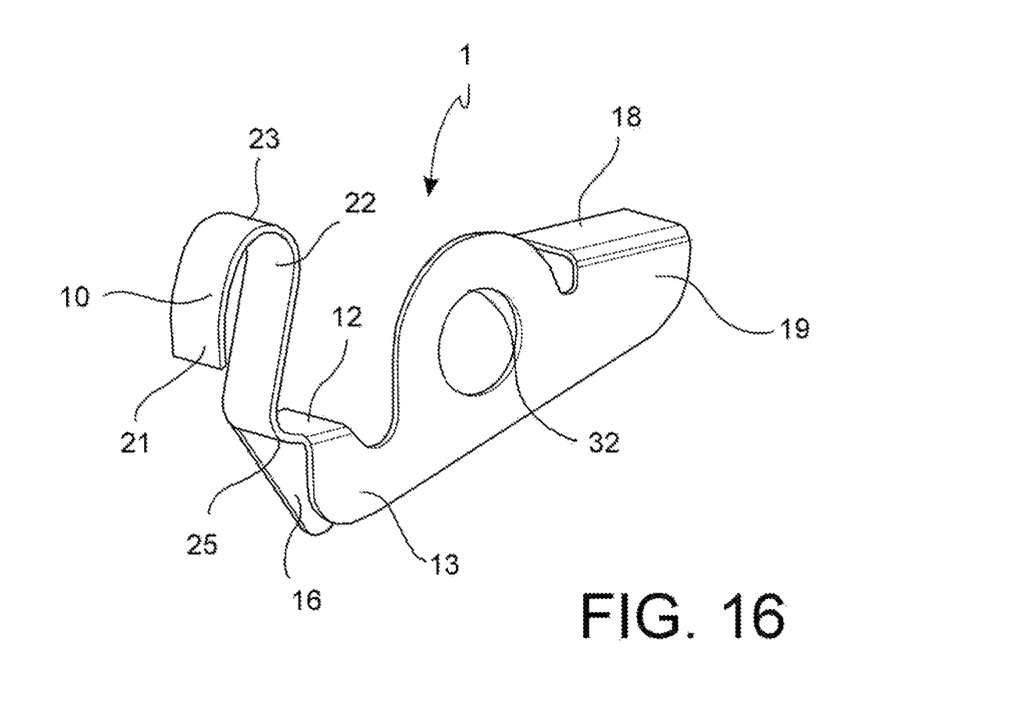
FIG. 16 represents the spring of FIG. 15—in axonometric view—according to a further point of view.
Figure 17:
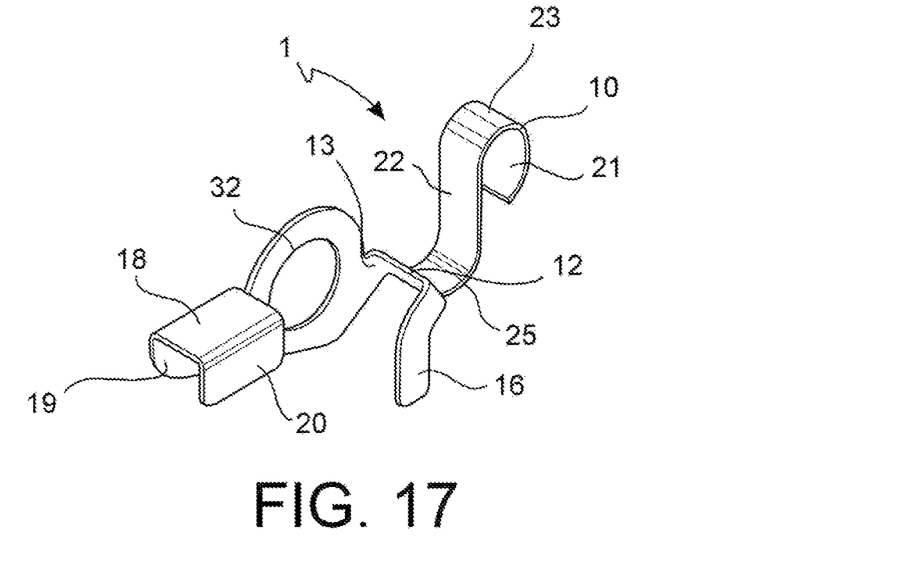
FIG. 17 represents—in axonometric view—the spring of FIG. 15 according to a further point of view.
Figure 18:
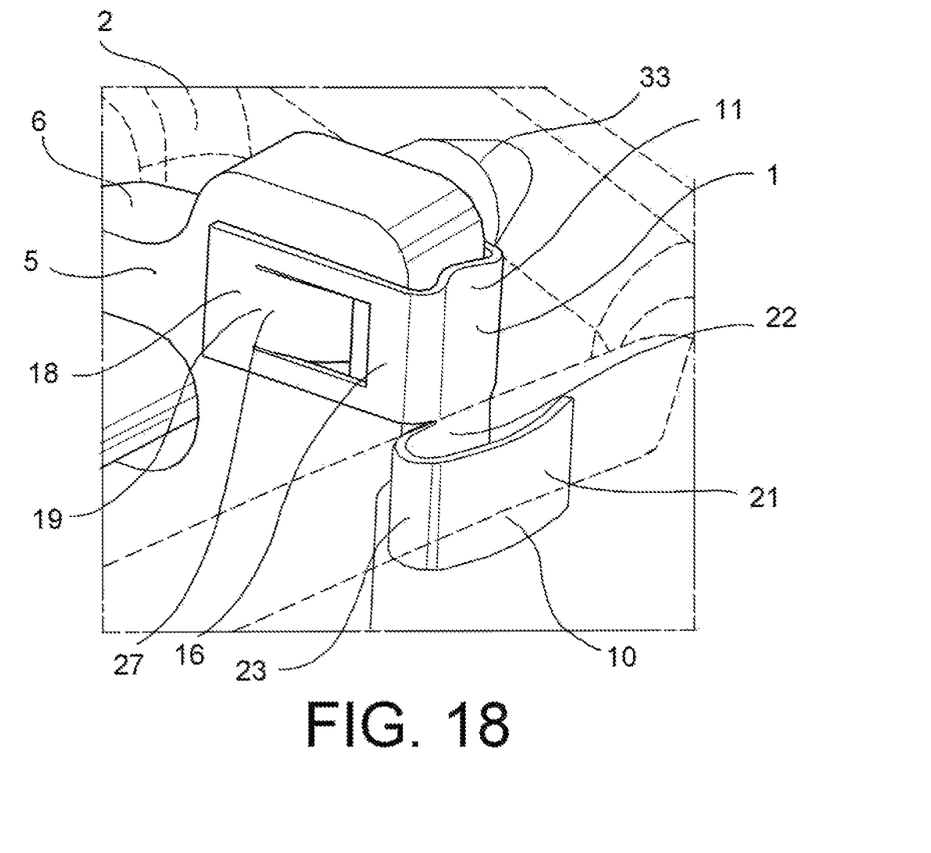
FIG. 18 represents a detail of a spring according to a further embodiment applied to a plate of a pad housed in a caliper.
Figure 19:
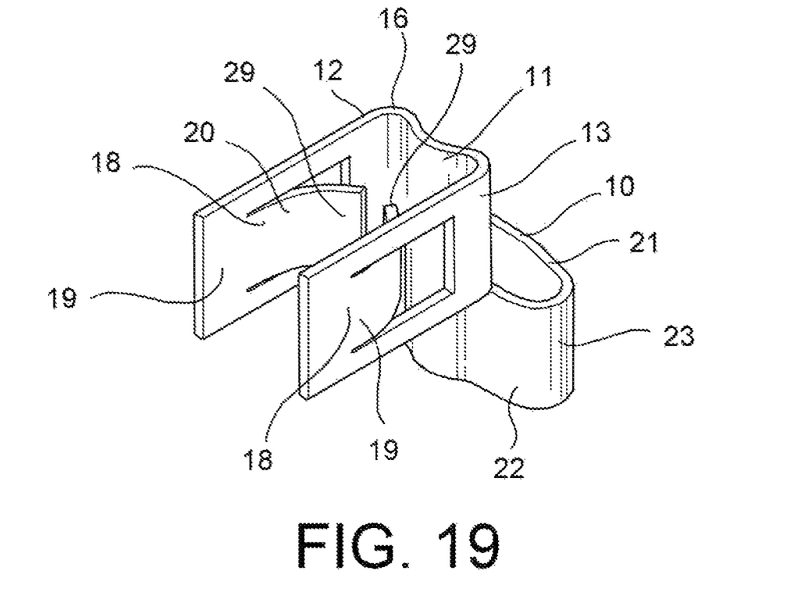
FIG. 19 represents—in axonometric view—a spring according to an even further embodiment.
Figure 20:
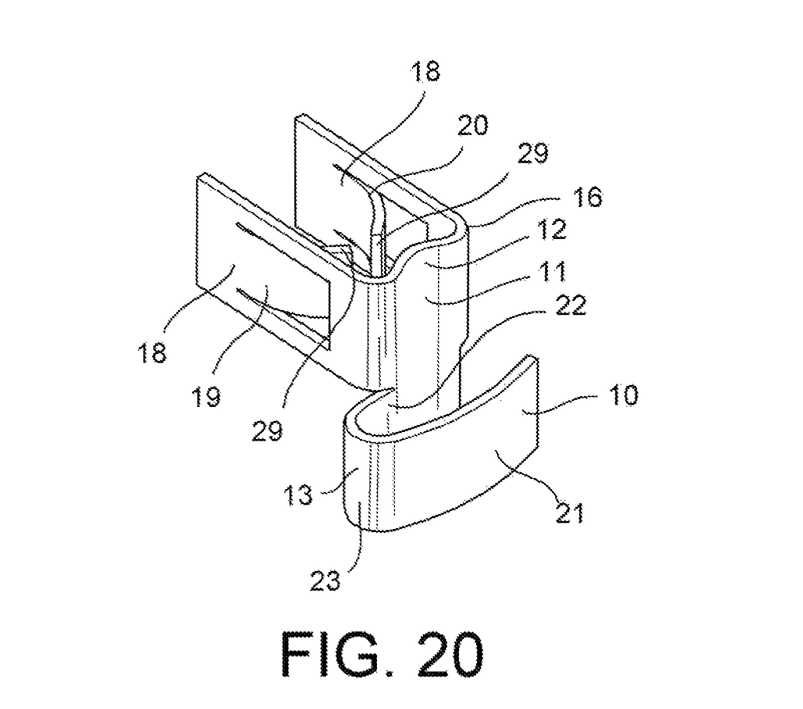
FIG. 20 represents—in axonometric view—with a different point of view of the spring of FIG. 19.

The figures show the axial direction A-A as a direction coincident or parallel to the rotation axis of a brake disc on which the caliper is arranged astride. R-R is instead used to indicate a radial direction i.e. a direction transverse to the axial direction and directed radially to the disc. T-T is used to indicate a tangential direction i.e. transverse to the axial and radial direction, or circumferential direction. In particular, indicated in FIG. 1—with a two ends arrow—is the direction towards which a pad moves in the caliper resting thereon or knocking against it in case of braking and change of travel direction of the vehicle.

Said spring 1 is suitable to be interposed between an edge 4 of a support plate 5 of a pad 6 and at least one wall 7 of a caliper body 8, with the aim of influencing the pad 6 at least along a tangential direction T-T, when the spring 1 is mounted on a caliper and in operating conditions.

The spring 1 is shaped so as to be arranged astride the edge 4 of the support plate 5 in proximity of a radially outer edge thereof when the spring is mounted on a caliper in operating conditions. Said spring 1 arranges its laminar body 3 astride a radially outer edge 9 of the support plate 5.

According to one embodiment, this laminar body 3 of the spring comprises a. flap portion or a tongue portion or a tab portion 10 bent as a bending spring.

According to one embodiment, said laminar body 3 comprises a first hooking portion 11 for resting on a radially outer portion of said plate edge 4 in a portion thereof substantially facing said wall of the caliper body 7. Said first hooking portion 11 has at least one C-shaped portion 12 to be arranged astride the aforementioned plate edge 4 with a first arm of the first hooking portion 13 adapted to rest on a first inner surface of the plate 14 which is facing the centreline plane of the brake disc 15. Said first hooking portion 11 further comprises a second arm of the first hooking portion 16 which is adapted to rest on a second outer surface of the plate 17 opposite the centreline plane of the brake disc 15.

According to one embodiment, said laminar body 3 further comprises a second hooking portion 18 for resting on a radially outer portion of said plate edge 4, in which said second hooking portion 18' comprises a first arm of the second coupling portion 19 adapted to rest, with at least one portion thereof, on a first inner surface of the plate 14 facing the centreline plane of the brake disc 15, and a second arm of the second coupling portion 20 adapted to rest, with at least one portion thereof, on a second outer surface of the plate 17 opposite the centreline plane of the brake disc 15.

According to one embodiment, said bent tab portion 10 comprises at least one first tab arm 21 which faces a second tab arm 22 and is connected thereto by means of a tab elbow 23.

According to one embodiment, said first tab arm 21 is adapted to face said wall of the caliper body 7.

According to one embodiment said first tab arm 21 is attached cantilevered to the remaining part of the laminar body 3 so as to avoid resting on the support plate 5 but only rest against the wall of the caliper body 7 or, in deformed conditions, rest against said second tab arm 22.

According to one embodiment, said bent tab portion 10 is suitable to stress the pad 6 at least tangentially T-T so as to maintain the pad 6 compressed between two springs arranged on the opposite ends of the support plate 5 and against opposite walls of the body of the caliper 7.

According to one embodiment, said bent tab portion 10 is C or capsized U-shaped and it is attached cantilevered to the first hooking portion 11.

According to one embodiment, when the spring 1 is mounted on a support plate 5, at least the bent tab portion 10 projects cantilevered from the support plate 5 above the pad or the friction material 24 thereof, resting on the wall 7 of the caliper body 8.

According to one embodiment, said spring 1 with the bending of its bent tab portion 10 resting on the wall 7 of the caliper body 8 is suitable to influence said pad in tangential direction T-T, when the spring is mounted on a caliper and in operating conditions, preventing the support plate 5 from striking with impact on the wall 7 of the caliper body 8 also in case of braking with change of the direction of travel of the vehicle.

According to one embodiment, said bent tab portion 10 has said first tab arm 21 and said second tab arm 22 arranged on a plane different from the plane which accommodates every part of the first hooking portion 11.

According to one embodiment, said second tab arm 22 is connected to said first hooking portion 11 through a connecting elbow 25.

According to one embodiment, said tab elbow 23 develops on lines parallel to a radial direction R-R, when the spring is mounted on a caliper and in operating conditions.

According to one embodiment, said tab elbow 23 faces with its convex elbow part 26 towards the internal of the caliper or the centreline of the brake disc, when the spring is mounted on a caliper and in operating conditions.

According to one embodiment, said tab elbow 23 develops on lines parallel to an axial direction A-A, when the spring is mounted on a caliper and in operating conditions.

According to one embodiment, said tab elbow 23 faces with its convex elbow part 26 towards the external radial direction or towards the external of the caliper, when the spring is mounted on a caliper and in operating conditions.

According to one embodiment, said second tab arm 22 is substantially arranged coplanar to at least one portion of said first hooking portion 11.

According to one embodiment, said second tab arm 22 is substantially adapted to face the edge of the pad support plate 4, when the spring is mounted on a caliper and in operating conditions.

According to one embodiment, a portion of the first hooking portion 11 arranged between said first arm of the first hooking portion 13 and said second arm of the first hooking portion 16 comprises a fold suitable to be arranged parallel to the edge of the pad support plate 4, when the spring is mounted on a caliper and in operating conditions.

According to one embodiment, a portion of the first hooking portion 11 arranged between said first arm of the first hooking portion 13 and said second arm of the first hooking portion 16 comprises a fold arranged transverse to the longitudinal extension of the second tab arm 2 so as to facilitate the bending deformation of said arm 22 when the pad 6 is stressed in abutment against the wall of the caliper body 7.

According to one embodiment, said second hooking portion 18 comprises opposing snap-wise engagement sheets 27, 28 which project cantilevered and have free bent ends 29 approaching each other.

According to one embodiment, said free bent ends 29 are adapted to be inserted snap-coupled into a seat or slot of the support plate 30 provided in proximity of the edge 4 of the support plate 5.

According to one embodiment, said free bent ends 29 are adapted to be inserted snap-coupled into a seat 30 for the attachment to the plate of balancing or anti-vibration masses of the pad 6.

According to one embodiment, said second hooking portion 18 comprises an arm of the second hooking portion 31 which extends radially cantilevered to be connected to the radially outer edge of the support plate 9.

According to one embodiment, said first hooking portion 11 is attached to said second hooking portion 18 interposing a portion forming a slot 32.

According to one embodiment, said slot is suitable to accommodate a pad suspension pin 33.

According to one embodiment, said slot has such dimensions as not to interfere with said pad suspension pin 33, avoiding rubbing and the formation of residual actions interfering with the operation of the caliper 2.

In the figures, an assembly is also represented comprising a pad 6 and a spring 1 as defined in any of the preceding embodiments.

In the figures, a caliper is also represented comprising an assembly as defined above.

Due to the reaction of the proposed spring the shoulder or abutment surface provided on the body of the caliper, as described in any of the preceding embodiments, it is possible to obtain the damping of the tangential motion of, the pads.

The simplicity of the proposed solutions shows how they neither require any design variation on the existing forms nor additional machining operations, thus greatly facilitating application on the previously installed and thus on solutions already available in catalogues and in the market.

Given that the caliper body and pads do not require design modifications they marginally affect the weight of the brake though drastically improving their performance in terms of comfort and travel and when changing the direction of travel of the vehicle.

In addition, the proposed solutions, can be instantly applied to existent calipers for example during periodic maintenance for checking or replacing friction materials, such as the pads or the brake disc.

Obviously, the proposed solutions can also be applied to caliper models different from the represented ones, for example brake calipers of the floating type as well as brake calipers that can be used both on motor vehicles and motorbikes.

One of the main advantages of the proposed solutions lies in having a bent tab portion which allows a considerable deformation, thus allowing controlling the elastic action of the spring, as well as a suitable load or preload design between the pad and the body of the caliper, also in conditions non-abutment of the pad against the body of the caliper.

For example, the solutions of proposed springs may be used for interposing a spring between the body of the calipers and the pad in the side thereof facing the reverse direction of travel. The travel or movement of the bent tab portion allows exerting a load or an elastic action between the body of the calipers and the plate of the pad preloading the plate so as to avoid a discontinuity of the elastic action at all times, shifting from the forward movement to the reverse movement of the vehicle and thus making the change of position of the of the pad in the caliper extremely fluid, hence avoiding any kind of vibrations or impacts even were dust or dirt to accumulate in the caliper.

The assembly according to the invention may be subjected, by a man skilled in the art with the aim of meeting specific needs, to numerous modifications and variants, all falling within the scope of the invention, as defined in the claims that follow.

According to one embodiment, the second hooking portion 18 is arranged astride the radially upper edge of the plate of the pad and it is suitable to accommodate—resting thereon—a second spring 34 for moving the pads away from the brake disc arranged between the two opposite pads received in the caliper and suitable to influence them moving them away from each other and thus from the brake disc. The action of this second spring 34 presses the spring 1 resting against the edge of the plate thus avoiding the rotations or movements thereof even further.

According to one embodiment, said first hooking portion 11 has a transverse fold, for example which extends in radial direction R-R when the spring is mounted operating conditions, which allows a slight movement of the first hooking portion on the edge of the plate so as to allow the snap-movement in position of the opposing snap-wise engagement sheets 27, 28.

According to one embodiment, said body of the laminar spring is obtained by shearing and bending from a sheet, for example sheared and bent or alternatively laser sheared and bent.

REFERENCES 1 spring
2 brake disc caliper
3 laminar body of the spring
4 edge of the pad support plate
5 support plate
6 pad
7 wall of the caliper body
8 caliper body
9 radially outer edge of the support plate
10 bent tab portion
11 first hooking portion
12 C-shaped portion of the first hooking portion
13 first arm of the first hooking portion
14 first inner surface of the plate
15 brake disc
16 second arm of the first hooking portion
17 second outer surface of the plate
18 second hooking portion
19 first arm of the second hooking portion
20 second arm of the second hooking portion
21 first tab arm
22 second tab arm 23 tab elbow
24 pad friction material
25 connecting elbow
26 convex elbow part
27 opposing snap-wise engagement sheets
28 opposing snap-wise engagement sheets
29 free ends of the opposing snap-wise engagement sheets
30 seat or slot of the support plate
31 arm of the second hooking portion
32 slot
33 pad suspension pin
34 second spring of for moving the pads away from the brake disc

The invention claimed is:

1. A spring of a caliper of a disc brake configured to be astride of a disc of a disc brake, the caliper comprising a caliper body with a caliper body wall; and the disc brake comprising a brake disc with a center plane; wherein the spring mounts on a brake pad, said brake pad comprising a support plate having a support plate edge, said support plate edge having a radially outer portion substantially facing said caliper body wall, said support plate having an inner first surface facing the center plane of the brake disc, and an outer second surface opposite the center plane of the brake disc; and wherein during operation the spring is configured to be intermediate an edge of the support plate of the brake pad and the caliper body wall to engage the brake pad in at least a tangential direction; said spring comprising:

a laminar body made in a single piece;

said laminar body extending substantially in the tangential direction, said spring being shaped to arrange astride of the edge of the support plate in a radially outer edge of the support plate edge; and said spring being shaped to position the laminar body astride of the radially outer edge of the support plate, wherein said laminar body comprises:

a first hooking portion resting on the radially outer portion of said support plate edge facing said wall of the caliper body; said first hooking portion having at least one "C" shaped portion to position astride said radially outer portion of said support plate edge with a first arm of the first hooking portion adapted to rest on the inner first surface of the support plate facing the center plane of the brake disc and a second arm of the first hooking portion adapted to rest on the outer second surface of the support plate;

a second hooking portion, the second hooking portion being spaced apart from the first hooking portion and resting on the radially outer portion of said support plate edge, wherein said second hooking portion comprises a first arm of the second hooking portion adapted to rest, with at least one portion of said first arm, on the inner first surface of the plate and a second arm of the second hooking portion adapted to rest, with at least one portion of the second arm, on the outer second surface of the plate;

and wherein:

said laminar body comprises a tab portion bent as a bending spring;

said bent tab portion comprises at least a first tab arm, said first tab arm being spaced apart from said first hooking portion and from said second hooking portion, said bent tab portion being adapted to face said wall of said caliper body;

said first tab arm is configured to face said wall of the caliper body in the tangential direction;

a second tab arm, said second tab arm being spaced apart from said first hooking portion and from said second hooking portion;

said first tab arm faces said second tab arm and is connected to the second tab arm by a tab elbow, the second tab arm being attached to said first hooking portion through a connecting elbow, wherein said bent tab portion, with the first tab arm and the tab elbow and the second tab arm, is "C" shaped or inverted "U" shaped and is attached cantilevered to the first hooking portion;

said first tab arm is attached cantilevered to the laminar body so as to avoid resting on the support plate, but only to contact the wall of the caliper body and, in a deformed condition, to contact said second tab arm while avoiding contact with said edge of the support plate and said first hooking portion and said second hooking portion.

2. The spring according to claim 1, wherein said bent tab portion is adapted to stress the pad at least tangentially in order to keep the tab compressed between two springs placed at the opposite ends of the support plate and against opposite walls of the caliper body.

3. The spring according to claim 1, wherein when the spring is mounted on the support plate, at least the bent tab portion projects cantilevered from the support plate above the pad or friction material of the pad, resting on the wall of the caliper body.

4. The spring according to claim 1, wherein the spring with the bending of the bent tab portion resting on the wall of the caliper body is adapted to influence said pad in the tangential direction, when the spring is mounted on a caliper and in operating conditions, preventing the support plate from striking with impact on the wall of the caliper body and when braking to reverse a direction of travel of the vehicle.

5. The spring according to claim 1, said body of the laminar spring comprising a sheared and bent sheet or laser cut and bent sheet.

6. The spring according to claim 1, wherein the bent tab portion has said first tab arm and said second tab arm arranged on a different plane from a plane which accommodates each part of the first hooking portion.

7. The spring according to claim 1, wherein said tab elbow is developed on lines parallel to a radial direction, when the spring is mounted on a caliper during operating conditions.

8. The spring according to claim 1, wherein said tab elbow faces with the convex elbow part towards an inside of the caliper or a center line of the brake disc, when the spring is mounted on a caliper and in operating conditions.

9. The spring according to claim 1, wherein said tab elbow is developed on lines parallel to an axial direction, when the spring is mounted on a caliper and in operating conditions.

10. The spring according to claim 1, wherein said tab elbow faces with a convex elbow part towards an outer radial direction or towards an outside of the caliper, when the spring is mounted on a caliper and in operating conditions.

11. The spring according to claim 1, wherein said second tab arm is substantially arranged coplanar with at least one stretch of said first hooking portion.

12. The spring according to claim 1, wherein said second tab arm is substantially adapted to face the edge of the pad support plate.

13. The spring according to claim 1, wherein a stretch of the first hooking portion arranged between said first arm of the first hooking portion and said second arm of the first hooking portion comprises a fold adapted to arrange parallel to the edge of the pad support plate, when the spring is mounted on a caliper and in operating conditions.

14. The spring according to claim 1, wherein a stretch of the first hooking portion arranged between said first arm of the first hooking portion and said second arm of the first hooking portion comprises a fold arranged transversely to the longitudinal extension of the second tab arm so as to facilitate bending deformation of said arm when the pad is stressed in abutment against the wall of the caliper body.

15. The spring according to claim 1, wherein said second hooking portion comprises opposing snap-wise engagement sheets which project cantilevered and have free bent ends approaching each other.

16. The spring according to claim 15, wherein said free bent ends are adapted to be inserted snap-wise in a seat or slot of the support plate provided in a vicinity of the edge of the support plate.

17. The spring according to claim 15, wherein said free bent ends are adapted to insert snap-wise in a seat for attachment to the plate of balancing or anti-vibration masses of the pad.

18. The spring according to claim 1, wherein said second hooking portion comprises an arm of the second hooking portion extending radially cantilevered to connect to the radially outer edge of the support plate.

19. The spring according to claim 1, wherein said first hooking portion is attached to said second hooking portion interposing a portion forming a slot between the first hooking portion and the second hooking portion.

20. The spring according to claim 19, wherein said slot is adapted to receive a pad suspension pin.

21. The spring according to claim 19, wherein said slot has dimensions configured to avoid interference with said pad suspension pin.

22. An assembly comprising a pad and a spring as defined in claim 1.

23. A caliper comprising an assembly according to claim 22.

* * * * *